US011835295B2

(12) United States Patent
Peterman et al.

(10) Patent No.: US 11,835,295 B2
(45) Date of Patent: Dec. 5, 2023

(54) MELT FURNACE HEADER GATE SYSTEM

(71) Applicant: GPRE IP, LLC, St. Louis, MO (US)

(72) Inventors: John M. Peterman, Troy, MO (US); Mark A. Roberts, St. Charles, MO (US)

(73) Assignee: GPRE IP, LLC, St. Louis, RI (US)

( * ) Notice: Subject to any disclaimer, the term of this patent is extended or adjusted under 35 U.S.C. 154(b) by 321 days.

(21) Appl. No.: 17/371,291

(22) Filed: Jul. 9, 2021

(65) Prior Publication Data
US 2022/0034588 A1 Feb. 3, 2022

Related U.S. Application Data

(60) Provisional application No. 63/049,764, filed on Jul. 9, 2020.

(51) Int. Cl.
| F27D 1/18 | (2006.01) |
| F27D 13/00 | (2006.01) |
| C22B 1/00 | (2006.01) |
| F27D 7/04 | (2006.01) |
| F27D 19/00 | (2006.01) |

(52) U.S. Cl.
CPC ............ F27D 13/002 (2013.01); C22B 1/005 (2013.01); F27D 1/1858 (2013.01); F27D 7/04 (2013.01); F27D 19/00 (2013.01); F27D 2019/0009 (2013.01); F27D 2019/0012 (2013.01); F27D 2019/0018 (2013.01); F27D 2019/0084 (2013.01)

(58) Field of Classification Search
CPC ........ F27D 13/002; F27D 1/1858; F27D 7/04; F27D 19/00; F27D 2001/1875; F27D 2019/0084; F27D 1/18; F27D 1/1808; F23M 7/02; C22B 1/005
See application file for complete search history.

(56) References Cited

U.S. PATENT DOCUMENTS

| 4,147,531 | A | * | 4/1979 | Miller | ................. | C22B 21/0007 |
| | | | | | | 75/687 |
| 5,441,556 | A | * | 8/1995 | Lewis | ................. | C22B 21/0092 |
| | | | | | | 266/156 |
| 8,758,674 | B2 | * | 6/2014 | Miani | ....................... | F27B 3/10 |
| | | | | | | 266/271 |
| 11,471,938 | B2 | * | 10/2022 | Fontana | ................. | B22D 39/02 |
| 11,635,258 | B2 | * | 4/2023 | Peterman | .............. | F27D 17/002 |
| | | | | | | 266/158 |

* cited by examiner

Primary Examiner — Gregory A Wilson
(74) Attorney, Agent, or Firm — Douglas D. Churovich, Esq.; Churovich Law, LLC (57) ABSTRACT

A metal furnace header gate system having a recirculation port in the furnace, a hot gas generator, a gas blower, and a furnace door. The door has an embedded gas manifold and outlet ports that each connect the manifold to a directional nozzle. The blower draws exhaust from the recirculation port into the hot gas generator, which generates additional exhaust and mixes the exhaust gases together. The blower forces this exhaust mixture into the manifold, through the nozzles, and into the furnace. A computer controls the blower and the hot gas generator to regulate the system.

20 Claims, 8 Drawing Sheets

FIG. 9

MELT FURNACE HEADER GATE SYSTEM

CROSS REFERENCE TO RELATED APPLICATIONS

This application derives and claims priority from U.S. provisional application Ser. No. 63/049,764 filed 9 Jul. 2020, which application is incorporated herein by reference.

STATEMENT REGARDING FEDERALLY SPONSORED RESEARCH OR DEVELOPMENT

Not applicable.

BACKGROUND OF THE INVENTION

This invention relates principally to a gateway or doorway for a metal furnace or kiln, and more particularly to a heat recirculating front gateway or doorway system for a coated scrap melting furnace that collects heated gases from inside the furnace and recirculates those gases through the doorway and onto the scrap metal loaded in the delacquering chamber of the furnace.

It has for some time been a standard practice to recycle scrap metals, and in particular scrap aluminum. Various furnace and kiln systems exist that are designed to recycle and recover aluminum from various sources of scrap, such as used beverage cans ("UBC"), siding, windows and door frames, etc. One of the first steps in these processes is to use a rotary kiln to remove the paints, oils, and other surface materials (i.e., volatile organic compounds or "VOC's") on the coated scrap aluminum (i.e. "feed material"). This is commonly known in the industry as "delacquering." Delacquering is typically performed in an atmosphere with reduced Oxygen levels and with temperatures in excess of 900 degrees Fahrenheit. However, the temperature range at which the paints and oils and other surface materials are released from the aluminum scrap in the form of unburned volatile gases typically ranges between 450 and 600 degrees Fahrenheit, which is generally known as the "volatilization point" or "VOL." The delacquering chamber may be run as hot as 900 degrees Fahrenheit to ensure that sufficient heat is transferred throughout the scrap load to achieve an internal temperature of at least 450 degrees Fahrenheit.

In various such metal recycling systems, the furnace comprises multiple compartments or chambers to accommodate serial steps in the recycle process. For example, for aluminum scrap that is coated with paints and various other surface materials, it is typical to remove such coatings from the scrap aluminum before the aluminum is actually melted. Thus, in a simplistic model, such an aluminum recycle system will require at least two chambers—one for delacquering and one for actual melt purposes. In at least one version of such a furnace, after delacquering the scrap metal becomes part of a melt flow that circulates between the delacquering and melt chambers. This allows new scrap metal to be placed in the melt flow and melted, while previously melted scrap can be siphoned off from the same recirculating flow.

For many reasons, temperature and heat control and balance in each of the furnace chambers is desirable in the operation of the furnace. Moreover, it is desirable to control the flow and direction of flow of the smoke and VOC gases generated in the furnace. Unfortunately, it is not surprising that the area nearest the doorway for placing scrap into the delacquering chamber experiences extreme temperature variations, and is the most difficult area in which to control smoke and VOC gas flows, particularly when the doorway gate or door is opened and closed, and when cold scrap metal is placed in the delacguering chamber through the doorway. It would therefore be desirable to have a system to provide enhanced control over the temperature and heat, as well as the flow of the smoke and VOC gases, in the delacguering chamber near the doorway. As will become evident in this disclosure, the present invention provides such benefits over the existing art.

BRIEF DESCRIPTION OF THE DRAWINGS

The illustrative embodiments of the present invention are shown in the following drawings which form a part of the specification.

Corresponding reference characters indicate corresponding parts throughout the several views of the drawings.

DETAILED DESCRIPTION

Figure 1:
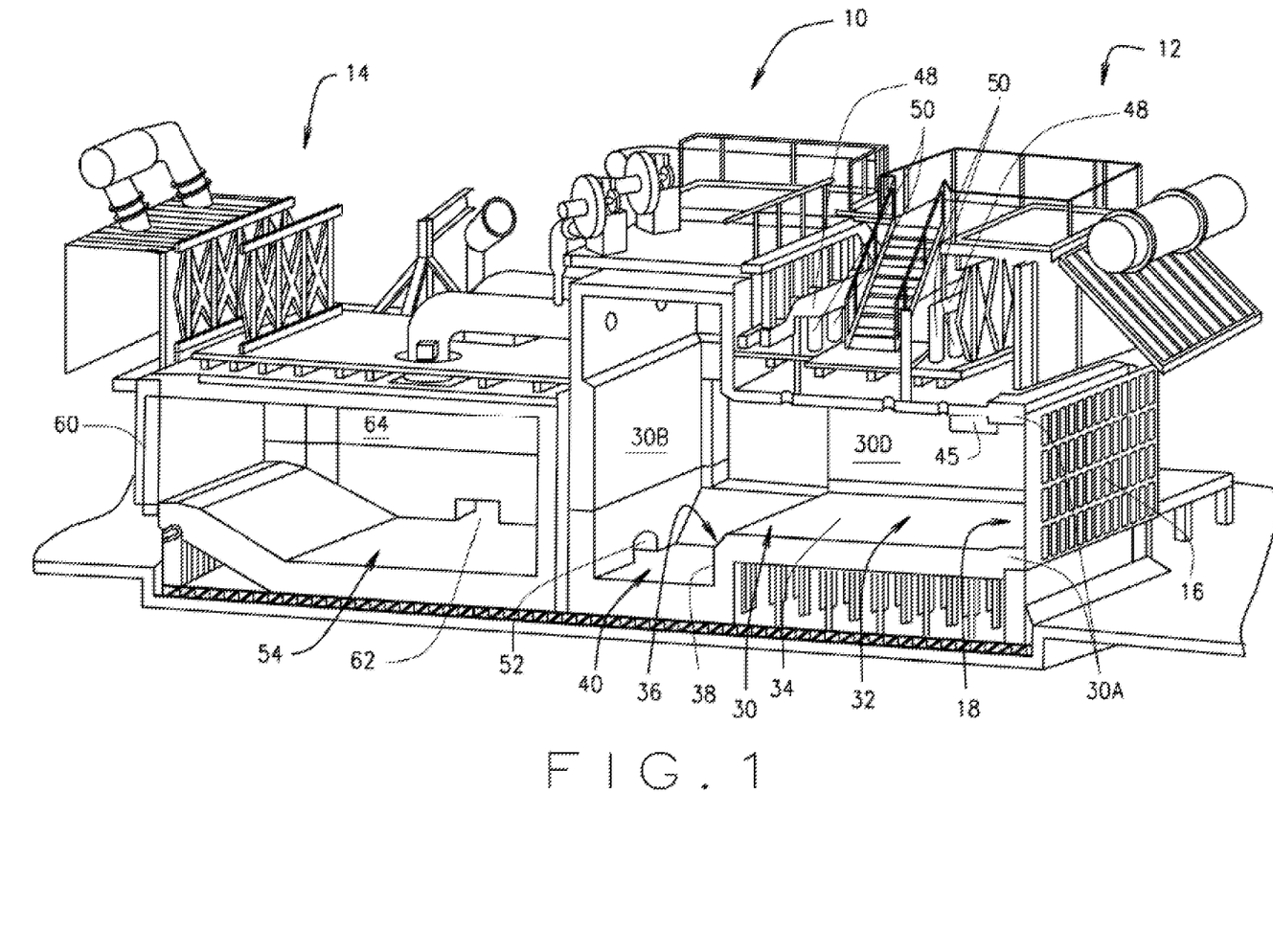
FIG. 1 is a perspective cross-sectional view of a scrap aluminum melt furnace with a delacguering chamber incorporating one embodiment of the present invention.
Figure 2:
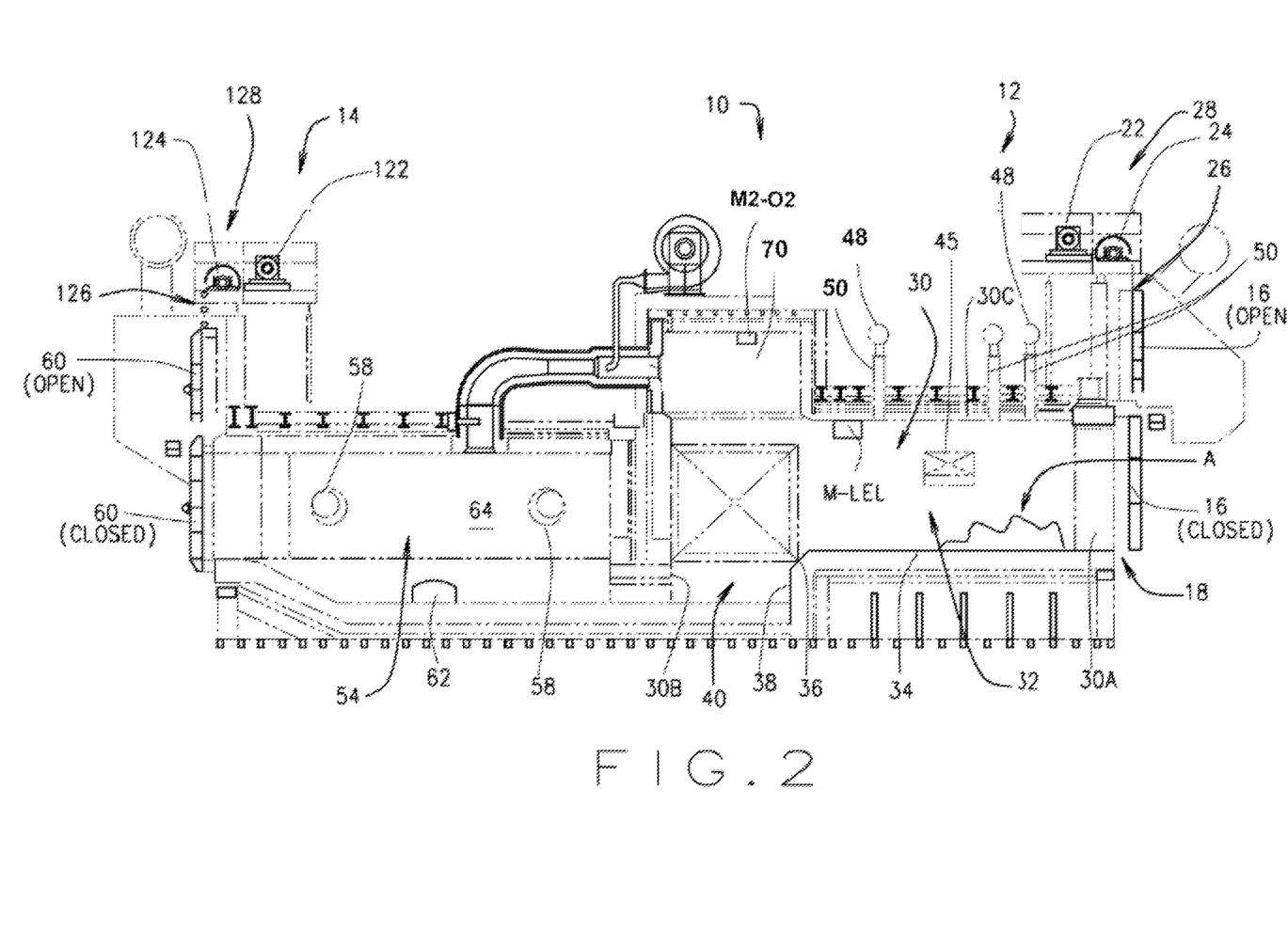
FIG. 2 is a partially diagrammatic cross-sectional plan view of the scrap aluminum melt furnace of FIG. 1.

In referring to the drawings, a schematic embodiment of a representative scrap aluminum delacquering and melt furnace 10 is shown generally in FIGS. 1-4, where the novel melt furnace header gate system 200 of the present invention is depicted by way of example as integrated into the furnace 10. As can be seen, the furnace 10 has a front end 12 and a back end 14 opposite the front end 12. A vertical, rectangular steel gate or door 16 is positioned, when closed, against a doorway 18 in the front end 12 of the furnace 10. The door 16 is approximately twenty-two feet wide and ten feet tall, and one foot thick. An electric lift motor 22 and associated lift gears 24, are positioned above the door 16 atop the front end of the furnace 10. A set of heavy chains 26 attach at one end to the door 16 and attach at the other end to the lift gears 24. The motor 22, lift gears 24 and chains 26 collectively form a door lift system 28 for the door 16. A computer control system CCS for the furnace 10 operatively communicates with the door lift system 28 to controllably raise and lower the door 16 between its closed position (as depicted in FIG. 1 and denoted in FIG. 2 as "CLOSED"), in which the door 16 rests against and seals the doorway 18, and its open position in which the door 16 fully exposes the doorway 18 (as depicted and denoted in FIG. 2 as "OPEN").

The doorway 18 opens into a large, generally rectangular delacquering or coated scrap chamber 30 constructed of steel and various refractory materials. The delacquering chamber 30 has a vertical front wall 30A having dimensions of approximately 9 foot high by 24 foot wide, a vertical rear wall 30B opposite the front wall 30A having dimensions of approximately 16 foot high by 24 foot wide, a horizontal ceiling 30C having dimensions of approximately 31 foot deep by 24 foot wide, a first vertical sidewall 30D having dimensions of approximately 9 foot high by 31 foot wide, and a second vertical sidewall 30E opposite the sidewall 30D likewise having dimensions of approximately 9 foot high by 31 foot wide. The front wall 30A includes the doorway 18 and the gate 16.

The delacquering chamber 30 further has a delacquering zone 32 that is approximately twenty feet wide by ten feet tall, and extends approximately twenty feet into the chamber 30 from the doorway 18. The delacquering zone 32 has a relatively flat floor 34 that extends at a slight incline downward from the doorway 18 to a one-foot wide beveled lip 36 that crosses the far end of the floor 34 opposite the doorway 18. Scrap aluminum A is loaded through the doorway 18 onto the floor 34 for initial processing in the chamber 30. The lip 36 slopes downward from the floor 34 at an angle of approximately 45 degrees to a vertical wall 38 that forms the front end of a depressed, generally rectangular pool, known as a "creek bed" 40, at the end of the delacquering chamber 30. The creek bed 40 is approximately two feet deep, twenty feet long and ten feet wide. The creek bed 40 terminates at the vertical rear wall 30B.

Figure 3:
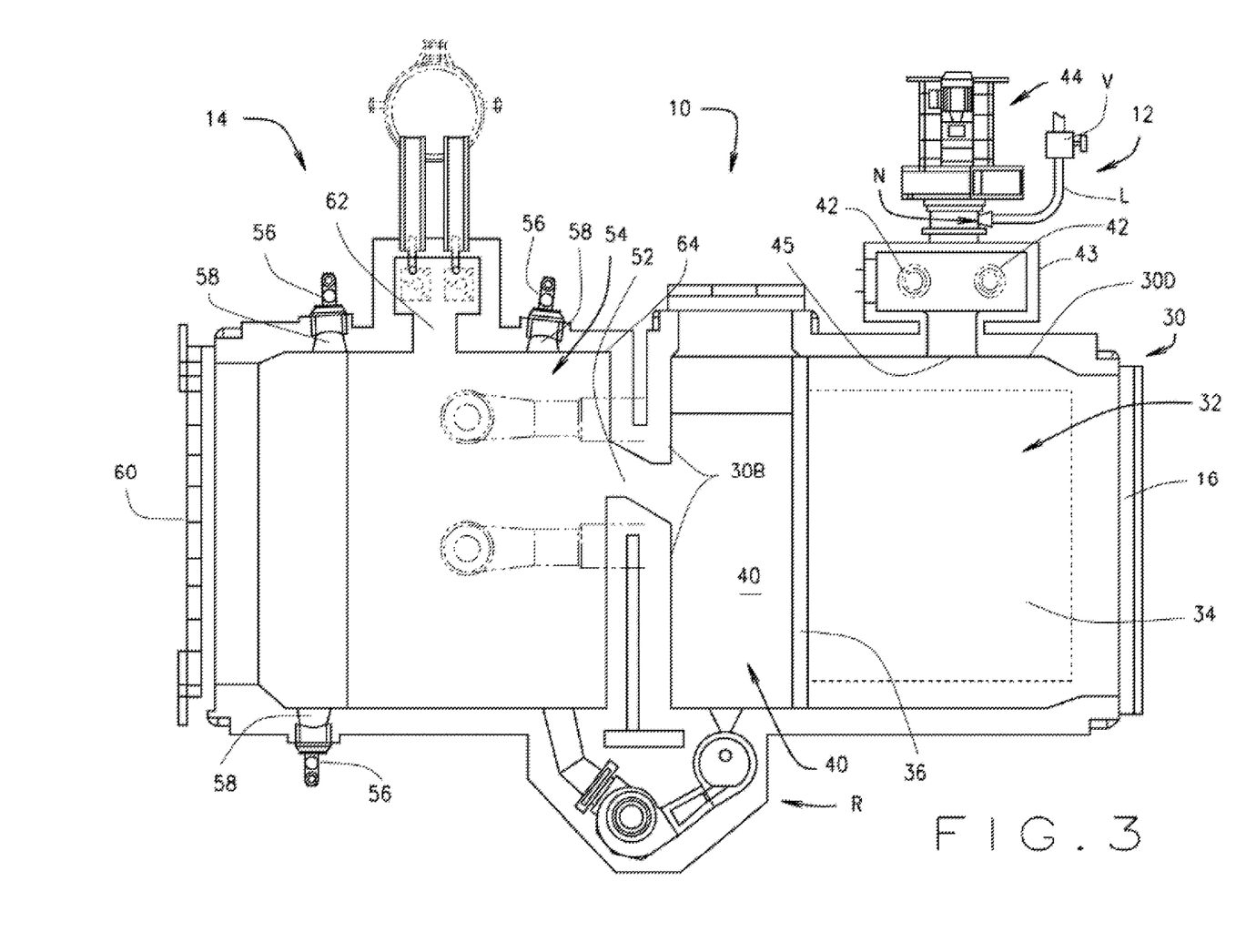
FIG. 3 is a top view of the scrap aluminum melt furnace of FIG. 1.
Figure 4:
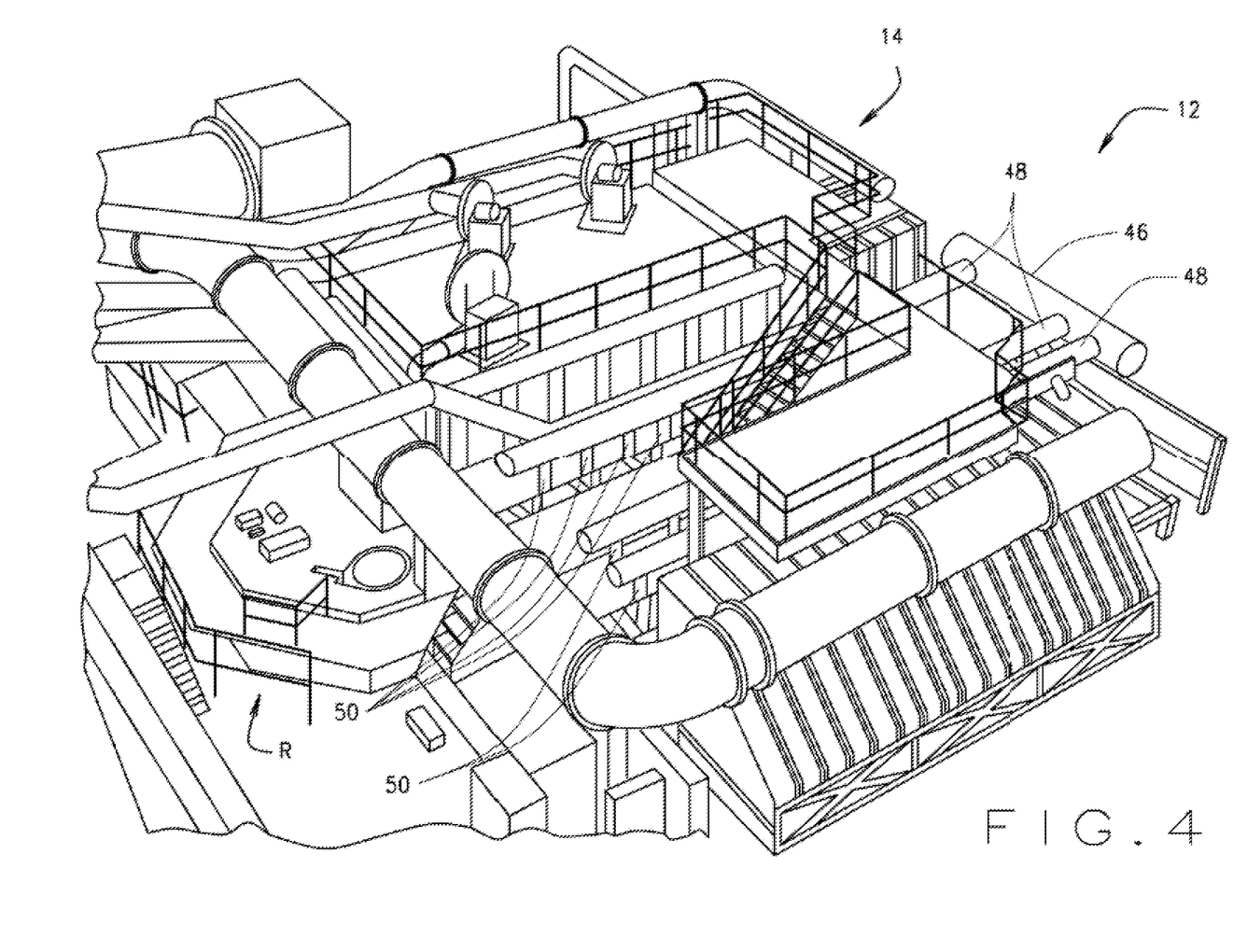
FIG. 4 is an alternate top front perspective view of the front end of the scrap aluminum melt furnace of FIG. 1.

Referring to FIGS. 3 and 4, it can be seen that a set of gas burners 42, associated with a hot gas generator 43, and a recirculation burner fan 44, are positioned outside the delacquering chamber 30 adjacent the vertical sidewall 30D. The gas burners 42 are positioned on top of, and extend partially into, the hot gas generator 43, such that the heat generated by the gas burners 42 is directed downward into the hot gas generator 43. The recirculation fan 44 draws gases from the delacquering chamber 30 through a square opening 45 in the middle of the sidewall 30D, and into the hot gas generator 43, where they are heated to approximately 1000 degrees Fahrenheit. These gases are heated using gaseous fuel, such as natural gas, which is supplied to the burners 42, to ignite and burn the gaseous fuel and to simultaneously heat the gases drawn from the delacquering chamber 30 in the hot gas generator 43. The recirculation fan 44 then directs the hot exhaust gases exiting the hot gas generator 43 into a cylindrical steel duct manifold 46 positioned above the burners 42 and horizontally next to the top of the furnace 10 above the delacquering chamber 30 (see FIG. 4). The manifold 46 directs the hot exhaust gases from the burners 42 into three smaller cylindrical steel ducts 48 that extend in a parallel fashion over the top of the delacquering chamber 30 above the floor 34. A series of even smaller cylindrical steel ducts 50 extend from each of the ducts 48 downward into and through the top of the delacquering chamber 30, such that the hot exhaust gases are directed downward into the chamber 30 and onto the scrap aluminum A positioned on the floor 34 of the chamber 30.

As can be seen from FIG. 3, a diagonal channel 52 running through the wall 30B connects the creek bed 40 to a second chamber 54 behind the wall 30B. This second chamber 54, having dimensions of approximately twenty feet wide and twenty feet long, is known as the "melt chamber" or "heating chamber" where the scrap aluminum A is fully melted and forms a pool of molten metal. A set of various gas fueled burners 56 direct heated exhaust gases through their associated cylindrical refractory ducts 58 into the heating chamber 54 to melt the aluminum in the chamber 54. The burners 56 help elevate the temperature in the heating chamber 54 to over 2,000 degrees Fahrenheit.

A rear gate 60 provides access to the heating chamber 54 for various activities, such as for example repairs, maintenance, upgrades, and cleaning. An electric lift motor 122 and associated lift gears 124, are positioned above the rear door 60 atop the rear end 14 of the furnace 10. A set of heavy chains 126 attach at one end to the top of the door 60 and attach at the other end to the lift gears 124. The motor 122, lift gears 124 and chains 126 collectively form a door lift system 128 for the door 60. The computer control system for the furnace 10 operatively communicates with the door lift system 128 to controllably raise and lower the door 60 between its closed position (as depicted in FIG. 1 and denoted in FIG. 2 as "CLOSED"), in which the door 60 rests against and seals the rear doorway, and its open position in which the door 60 fully exposes the rear doorway (as depicted and denoted in FIG. 2 as "OPEN").

A channel 62, positioned at the bottom of a sidewall 64 of the heating chamber 54 provides a path for molten aluminum to exit the heating chamber 54 for removal from the furnace 10.

As can be appreciated, Applicants' aluminum recycling system or furnace 10 utilizes a multi-step process. First, bulk loads or bails of coated aluminum scrap A are fed into the furnace's coated scrap hearth or delacquering chamber 30 through the full-width hearth doorway 18 when the door 16 is in its raised or "OPEN" position. The burners 42 heat the hot gases to approximately 1000 Deg. F and the recirculation blower 44 forces these hot gases down upon the pile of coated scrap aluminum A positioned on the floor 34 of the delacquering chamber 30. These hot gases are introduced into the delacquering chamber 30 above the coated scrap aluminum A. As the scrap aluminum A moves from the doorway 18 to the creek bed 40 across the floor 34, the organics and other non-metal particulates (i.e., the "VOC's") volatilize and are drawn into a vacuum hood 70 above the creek bed 40.

After the VOC's have been removed from the scrap aluminum A in the delacquering chamber 30, the scrap aluminum drops into the creek bed 40, where it joins a flow of molten aluminum recirculating from the heating/melt chamber 54. The molten aluminum in the creek bed 40 circulates into the heating chamber 54 through the channel 52 in the rear sidewall 30B of the chamber 30. The molten aluminum is heated in the heating chamber 54 by the heat generated by various heat sources, including the burners 56. A portion of the melted aluminum in the heating chamber 54 is allowed to exit the furnace 10 through the channel 62 for removal from the system 10, while another portion of the melted aluminum is returned to the creek bed 40 by a molten metal recirculating system R (see FIG. 3).

An Oxygen monitor M-O2 (see FIG. 7; not shown in FIGS. 1-6) positioned in the exhaust flue for the heating chamber 54 continually monitors Oxygen levels evacuating the chamber 54 and communicates its readings to the computer control system CCS. The CCS adjusts and controls the air/gas ratio of the heating chamber burners 56 to ensure the burning of any residual VOC's before such VOC's exit the chamber 54.

Further, another Oxygen monitor M2-O2 positioned in the hood 70 continually monitors Oxygen levels in the hood 70 over the creek bed 40, generates an electric signal indicative of the Oxygen level in the hood 70, and communicates that electronic signal to the computer control system CCS. This 4-20 mA electric signal reflects a range of 0% to 21% Oxygen. The Oxygen level in the delacquering chamber 30 will have a predetermined "low O2" set-point between 0-6% to prevent combustion from occurring in the delacquering chamber 30. The burner fuel-mix ratios for each of the burners 42 in the hot gas generator 43 are adjusted and controlled by the computer control system CCS based upon the Oxygen level measured in the hood 70 by the monitor M2-O2, so as to maintain a desired Oxygen level within the delacquering chamber 30. Programmed limits will prevent the burners 42 from firing outside of acceptable Oxygen ratio limits.

Finally, a lower explosive limit ("LEL") monitor M-LEL, located in the delacquering chamber 30, detects the explosive level of the atmosphere within the delacquering chamber 30, and communicates that LEL level to the computer control system CCS. In the event that the LEL reading exceeds a predetermined "safe" level, the computer control system CCS recognizes an alarm state in the furnace 10 and opens an electronically controlled gas shut-off valve V connected to a Nitrogen supply line attached to the furnace 10, so as to automatically inject Nitrogen gas into the delacquering chamber 30 to reduce the LEL level and minimize the risk of explosion in the chamber 30. The Nitrogen gas is injected through an inlet gas port N proximate the recirculation blower 44. This results in generally even distribution of Nitrogen gas throughout the entire delacguering chamber 30. Of course, the Nitrogen can be injected at nearly any position in the system so long as sufficient Nitrogen reaches the chamber 30 to rapidly compensate for an excessive LEL reading. Of course, other neutral gases or neutral gas mixtures can be used in place of Nitrogen. When such an event occurs, the furnace doors 16 and 60 will both be automatically locked by the computer control system CCS during such high LEL event, and will not be allowed to open until the LEL reading has been reduced to a safe level.

Referring now to FIGS. 5-8, a first embodiment of the novel melt furnace header gate system 200 and various components of said system are depicted. The system 200 includes a recirculation port 202, a gas conduit 204, a hot gas generator 206, a gas conduit 208, a recirculation blower 210, a gas conduit 212, a steel gate or door 214 and a door frame 216, the door 214 and the door frame 216 collectively forming a doorway or gateway 217.

Figure 5:
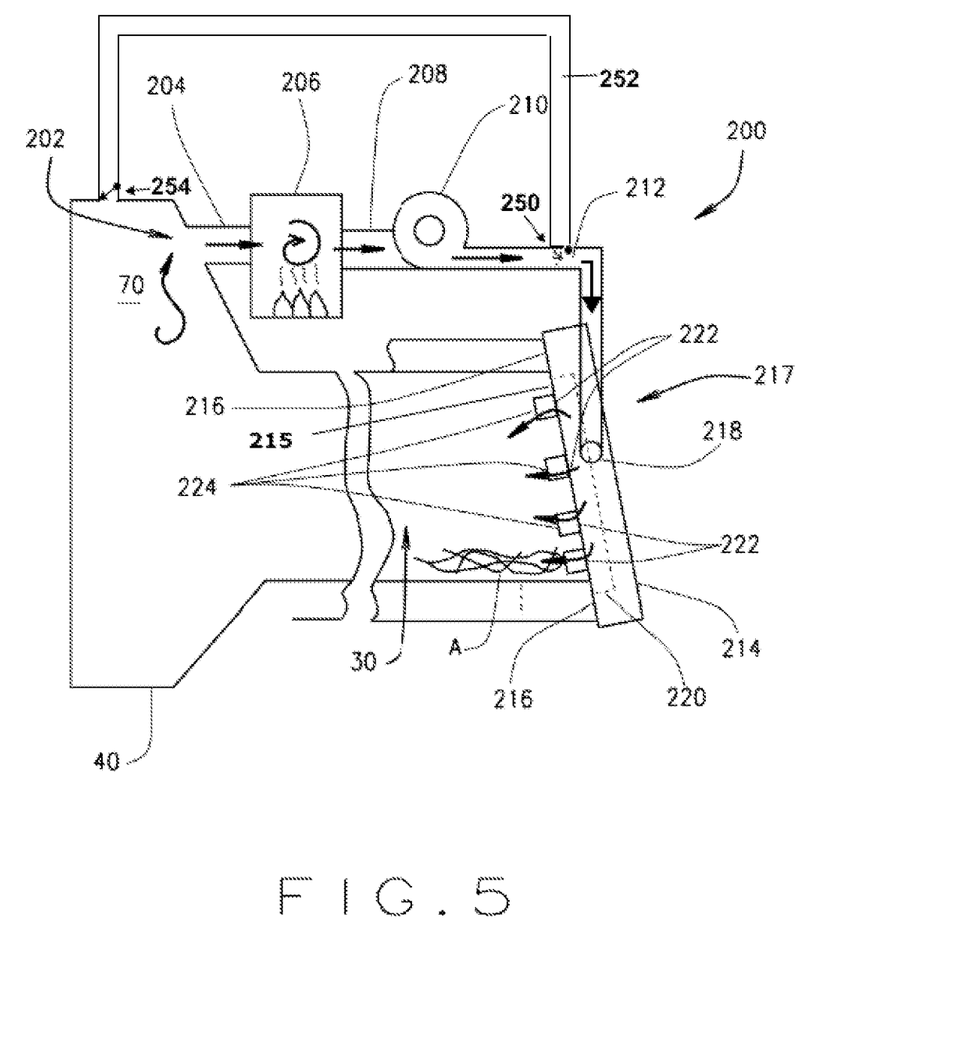
FIG. 5 is a side schematic view of a first embodiment of the melt furnace header gate system of the present invention incorporated into the furnace of FIG. 1.
Figure 6:
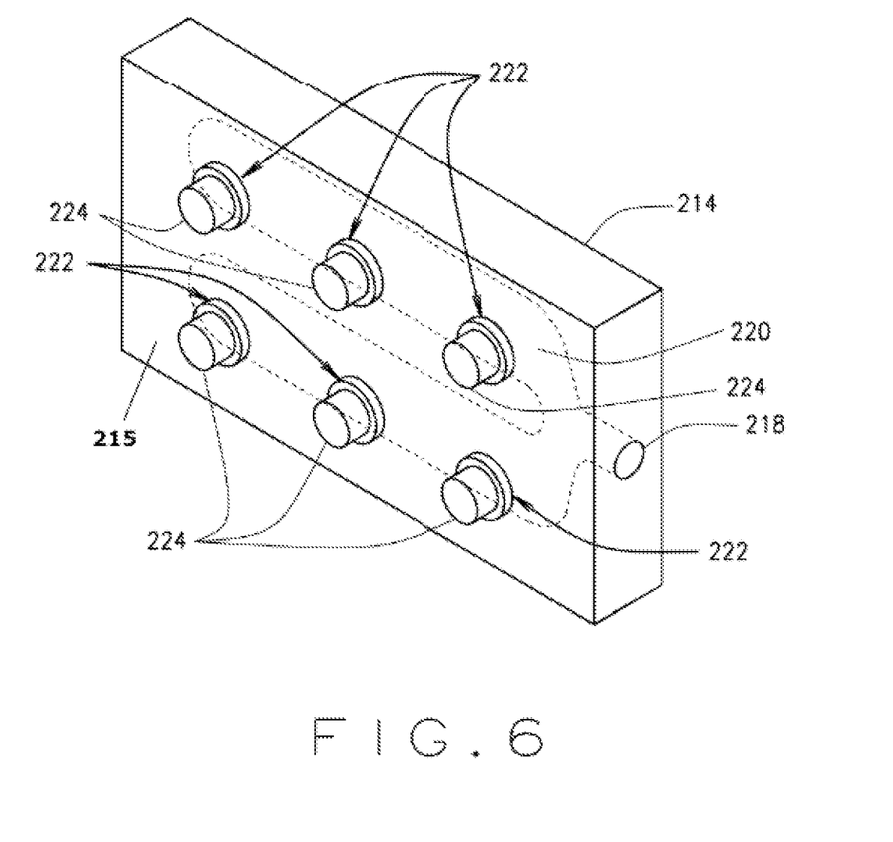
FIG. 6 is a perspective view of the door of the header gate system of FIG. 1.
Figure 7:
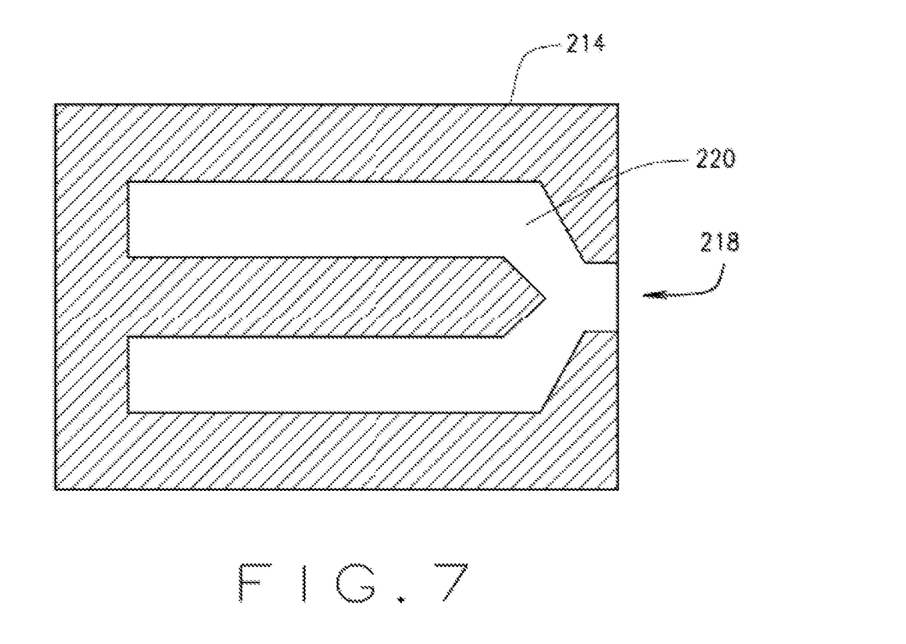
FIG. 7 is a cross-sectional view of the door of the header gate system of FIG. 1.

Referring particularly to FIGS. 6 and 7, the door 214 is an alternative to, and replaces the standard door 16 for the furnace 10. The door 214 is sized and shaped such that the outer perimeter of the door 214 mates in a flush manner with the door frame 216 to substantially close the gateway 217. When so closed, the door 214 rests and locks against the door frame 216 with the upper end oriented at an inward-leaning angle of approximately ten degrees. A wide variety of heavy door opening devices and systems well known in the art can be used to open and close the door 214, including the door lift system 28 described above. That is, the heavy chains 26 can be attached at one end to the door 214 and attached at the other end to the lift gears 24. The computer control system CCS for the furnace 10 can be also be used such that the CCS operatively communicates with the lift system 28 to controllably raise and lower the door 214 between its closed position (as depicted in FIG. 5), in which the door 214 rests against and seals the door frame 216, and its open position in which the door 214 exposes the gateway 217 (not shown).

The door 214 has an inner face 215 that is directed inward toward the delacquering chamber 30 when the door 214 is in its closed position against the door frame 216. The door 214 also has an inlet port 218 along one side of the door that connects with and opens into a gas manifold 220 positioned inside and across the body of the door 214. The gas manifold 220 has two legs or arms that each open into a set of three identical gas outlet ports 222 on the inner face of the door 214. Each of the outlet ports 222 has an adjustable nozzle assembly 224 extending outward from the inner face 215 of the door 214. Thus, when the door 214 is pressed against the door frame 216 to close the gateway 217, the nozzle assemblies are all directed into the furnace 10 toward the delacquering chamber 30. As can be seen from FIG. 5, the nozzle assemblies 224 are generally oriented perpendicular to the face 215 of the door 214. Because the door 214 closes against the door frame 216 at an angle of approximately ten degrees, the nozzle assemblies 224 are pointed somewhat downward by the same ten-degree slope towards the floor 34 of the delacquering chamber 30. Hence, as can be appreciated, the heated gases exiting the nozzle spouts 246 will be directed across the top of the scrap metal A positioned on the floor 34 of the delacquering chamber 30. This creates a "scrubbing" effect that causes the gases and fumes in the area above the scrap metal A to move away from the scrap metal A and towards the rear of the delacquering chamber 30.

Figure 8:
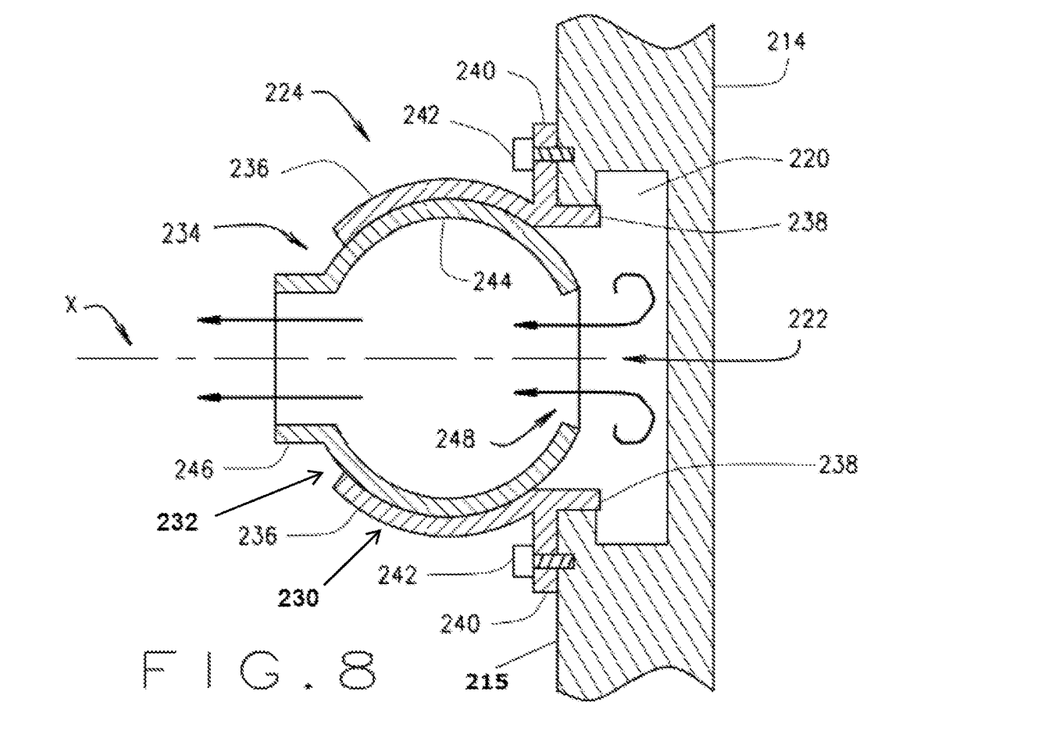
FIG. 8 is a cross-sectional view of one of the adjustable nozzles attached to an outlet port in the door of the header gate system of FIG. 1.
Figure 9:
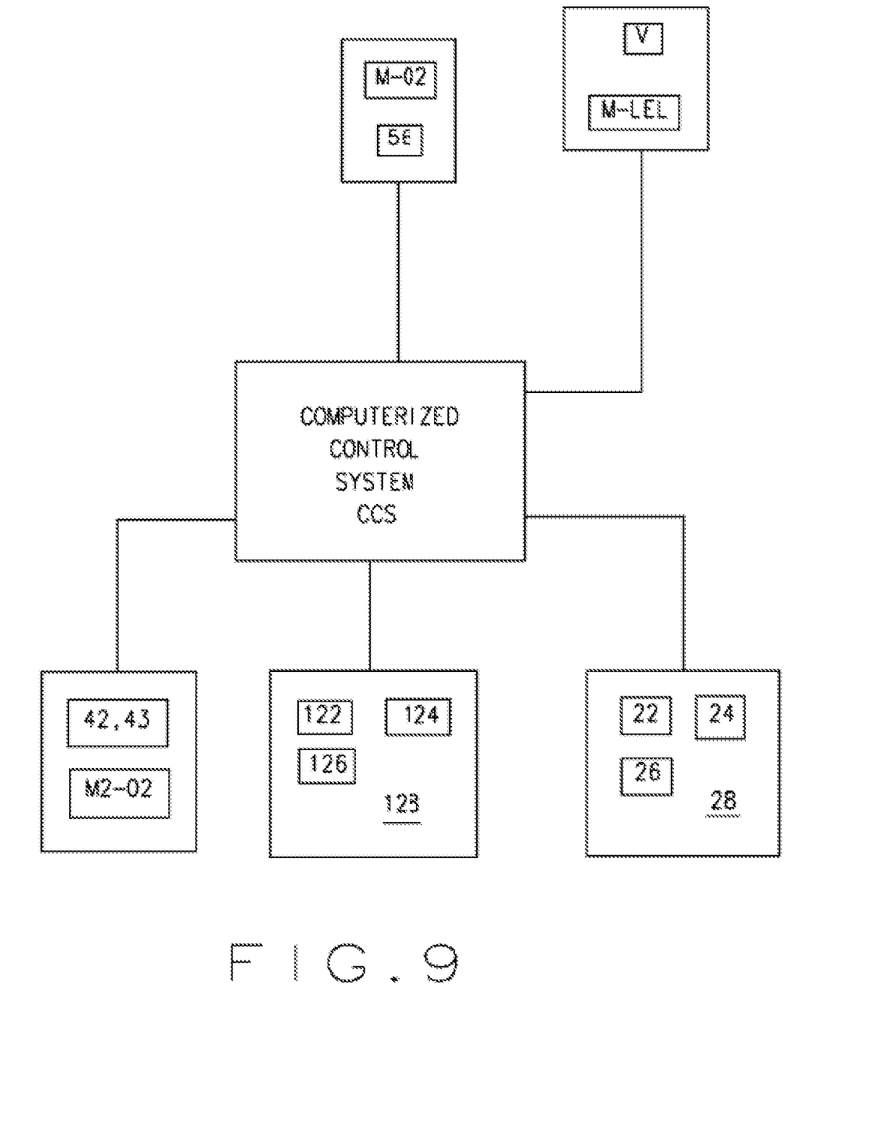
FIG. 9 is a schematic computer system flow chart of the computer control system for the furnace of the present disclosure in association with various system control loops.

Turning to FIG. 8, it can be seen that the six nozzle assemblies 224 are all identical, each comprising a generally spherical steel housing 230 and a matching generally spherical steel nozzle 232 held snugly within the housing 230. The housing 230 has a circular outer opening or outlet 234. From the outlet 234, the housing 230 extends along a central axis X to form a central body 236 having a truncated, but generally spherical shape, that terminates where the central body 236 joins with and opens into a short cylindrical inner opening or inlet 238 that is coaxial with the central body 236 and the outlet 234. A flat annular flange 240 extends radially outward from the side of the housing 230 near the interface between the central body 236 and the inlet 238. The annular flange 240 is sized and shaped to fit flush over its respective gas outlet port 222, and the inlet 238 is sized and shaped to mate with and fit snugly in the outlet port 222. A set of metal screws 242 secure the housing 230 to the door 214 over the outlet port 222.

The six nozzles 232 are likewise identical, each comprising a generally spherical body 244 and a short cylindrical spout 246. The nozzle 232 has a circular inner opening or inlet 248. From the inlet 248, the nozzle 232 extends along a central axis X to form the body 244 having a truncated, but generally spherical shape, that terminates where the body 244 joins with and opens into the spout 246. The spout 246 is coaxial with the body 244 and the inlet 248. When properly assembled, the nozzle 232 is positioned in the housing 230 with the nozzle's spout 246 extending outward through the housing's outlet 234. As can be seen, the diameter of the housing outlet 234 is substantially greater than diameter of the spout 246. In this way, the nozzle 232 fits snugly, yet rotationally, within the housing 230, yet can be rotated within the housing 230 to point the spout 246 in an infinite number of directions within the range defined by the housing outlet 234. Thus, each nozzle assembly 224 is configured to be multidirectional and can each be independently aimed or pointed in a desired radial direction away from the outlet gas ports 222 along the inner surface of the door 214.

Referring again to FIG. 5, it can be seen that the recirculation port 202 opens into the front face of the vacuum hood 70 above the creek bed 40 in the furnace 10. The gas conduit 204 extends at one end from the recirculation port 202 to the inlet of the hot gas generator 206. Inside the hot gas generator 206, gaseous fuel is mixed with air or oxygen and burned to generate hot gasses under controlled conditions. The gas conduit 208 extends and provides a gaseous path between the outlet of the hot gas generator 206 and the inlet of the recirculation blower 210. Similarly, the gas conduit 212 extends and provides a gaseous path between the outlet of the recirculation blower 210 and the inlet port 218 on the side of the door 214. The inlet port 218 opens to the manifold 220, which in turn opens to the six outlet ports 222.

As can be appreciated, hot exhaust gases from the delacquering chamber 30 rise into the vacuum hood 70. When the header gate system 200 is activated, the blower 210 will turn ON and generate a vacuum in the gas conduit 208. The vacuum created in the gas conduit 208 draws the hot exhaust gases from the vacuum hood 70, through the gas conduit 204, and through the hot gas generator 206. The hot gas generator, provided with gaseous fuel, generates additional hot exhaust gases that combine with the hot exhaust gases drawn from the vacuum hood 70. This hot exhaust gas mixture is then pulled into the blower 210. The blower 210 will then discharge and force the combined hot exhaust gasses from the hood 70 and the hot gas generator 206 through the gas conduit 212, and into the inlet port 218 on the side of the door 214. From the inlet port 218, the combined hot exhaust gasses are driven into the manifold 220, through the six outlet ports 222, out the nozzle assemblies 224, and into the delacguering chamber 30 at a direction dictated by the selected radial orientation of each nozzle 232 within its respective nozzle housing 230.

Of course, it is undesirable for the recirculated hot exhaust gases to be loosed upon the open environment outside of the furnace 10 proximate the doorway 218. Hence, when the door 214 is OPEN or not fully CLOSED against the door frame 216, recirculation of the hot exhaust gases must either be stopped entirely or redirected back into the body of the furnace 10. Here, turning again to FIG. 5, a directional gas valve 250 is positioned in the gas conduit 212. When the door 214 is not fully CLOSED, the directional gas valve 250 opens downward to prevent the flow of the hot exhaust gases to the manifold 220 in the door 214, and instead diverts those gases upward through a return gas conduit 252 that directs the gases through a gas check valve 254, and back into the hood 70. The gas return valve 250 can be closed in its upward position when the door 214 is properly seated and fully closed against the door frame 216. This may also be accomplished by a variety of other means, such as for example, shutting off the blower 210, or placing a shut-off valve in the system 200 and closing the valve. These various means to stop or redivert the flow of the hot exhaust gases can be operated manually, or controlled by one or more dedicated control loops that are independent of, or associated with, the computer control system CCS.

While we have described in the detailed description a configuration that may be encompassed within the disclosed embodiments of this invention, numerous other alternative configurations, that would now be apparent to one of ordinary skill in the art, may be designed and constructed within the bounds of our invention as set forth in the claims. Moreover, the above-described novel melt furnace header gate system 200 for a metal recycle furnace 10 of the present invention can be arranged in a number of other and related varieties of configurations without expanding beyond the scope of our invention as set forth in the claims.

For example, the system 200 is not necessarily required to be installed in an aluminum delacquering and recycling system 10 as depicted in FIG. 5, but may be installed or otherwise incorporated into a variety of configurations of metal recycling furnace and kiln systems. Further, the system 200 is not constrained to the specific configuration as shown in this disclosure, but may instead comprise various shapes, sizes and may be located at different positions on the furnace 10, so long as the system 200 performs the function of controllably recycling exhaust gasses and fumes from the interior of the furnace 10 back into the front end of the furnace 10 through the door 214, with the option of controllably directing the flow of those recycled gases in the furnace chamber proximate the door 214 of the system 200, such as for example onto the scrap aluminum A in the delacquering chamber 30. Similarly, it is not required that the furnace 10 be equipped with exactly one system 200. Rather, the furnace 10, and for that matter other furnaces and kilns using the unique system 200 as presented here, may incorporate various numbers of systems 200 for the same or multiple doors or gates opening into the furnace 10, so long as such systems perform the functions outlined in this disclosure.

By way of additional example, the manifold 220 can have a variety of shapes and sizes, so long as the manifold 220 provides the function of collecting the hot exhaust gases from the inlet port 218, and directing them to the inner face 215 of the door 214 and through the outlet ports 222, as discussed herein. The manifold 220 may have a single arm or leg, or multiple arms or legs, each of identical lengths and dimensions, or each having differing lengths and dimensions, and such legs or arms can be positioned at different depths within the door 214. In addition, the door 214 can have more than one manifold 220. Moreover, the manifold 220 need not be formed in or a part of the door 214, but instead can be a component separate from the door 214, such as for example a set of conduits attached to the inner face 215 of the door 214. There may also be more than one inlet port 218 providing gas to the manifold 220, and the inlet port(s) 218 can be located at virtually any position on the door 214 so long as the inlet port(s) 218 function to provide the recirculated exhaust gases to the manifold 220 as described herein.

Further, the nozzle assemblies 224 are not limited to the configuration depicted, but may comprise a variety of alternate configurations, so long as the assemblies can be attached to or are formed in the inner face 215 of the door 214, and can perform the function of controllably directing hot gases from the manifold 220 into the delacquering chamber 30 as described herein. For example, the assembly may be constructed to attach to the inner face 215 with threads, clamps, latches, or any of a variety of other well-know attachment means. Alternatively, the assemblies 224 can be formed in, or otherwise integral to, the inner face 215. Further, the nozzle assemblies 224 need not be adjustable but can have a preset angle for gas flow relative to the inner face 214.

Moreover, the spouts 246 can have a variety of shapes and constructions other than what is shown. For example, the spouts 246 can each have more than one outlet, each can be formed of multiple components that interlock or may be threaded or otherwise attached together, and that enable the spout 246 to be oriented and/or shaped to controllably direct the flow of gases in virtually any direction. The spouts 246 can also have adjustable nipples or valves that controllably regulate the flow of gases through the spouts 246. The spouts 246 can also be automated such that a control mechanism automatically adjusts or orients the spout 246 in a desired direction. Such a control mechanism can be computerized and can be interfaced with the computer control system CCS of the furnace 10.

In addition, the novel melt furnace header gate system 200 may include an automated gas control loop (not shown). Such a gas control loop may consist of: (i) one or more sensors that detect and/or measure one or more operational conditions in the furnace delacquering chamber 30 and/or the melt chamber 54, such as for example, temperature, gas flow rate, and volatiles concentration; (ii) a mechanical and/or electronic and/or computer controller; and (iii) one or more regulators adapted to control gas flanges in the system 200 and/or the operational speed of the blower 210. The gas control loop can be used to control the flow of gas from the furnace 10 through the header gate system 200. That is, the header gate system 200 can be controlled by mechanical and/or electronic and/or computerized control systems. For example, the system 200 can be controlled by a preset or programmable computer ("CPU"), and in particular the furnace's computer control system CCS, that is connected to monitors, such as for example one of the oxygen monitors in the system, and to controllable components, such as for example the amount of fuel gas supplied to the hot gas generator or the speed of the variable speed blower 210, such that the CPU can collect operational data from the monitor(s), and input that data into a program in the CPU to automatically control the speed of the blower 210 to predictably control the amount of hot exhaust gases pulled into the system 200 from the hood 70 and/or the hot gas generator 206.

Additional variations or modifications to the configuration of the above-described novel melt furnace header gate system 200 for a metal recycle furnace 10 of the present invention may occur to those skilled in the art upon reviewing the subject matter of this invention. Such variations, if within the spirit of this disclosure, are intended to be encompassed within the scope of this invention. The description of the embodiments as set forth herein, and as shown in the drawings, is provided for illustrative purposes only and, unless otherwise expressly set forth, is not intended to limit the scope of the claims, which set forth the metes and bounds of our invention.

What is claimed is:

1. A header gate system for a metal recycling furnace, said furnace having a delacquering chamber with a doorway opening into said delacquering chamber, said furnace having an exhaust hood positioned proximate said delacquering chamber, said exhaust hood collecting exhaust gases from said delacquering chamber, said header gate system comprising:
    a. a door adapted to close at least in part said furnace doorway, said door having an inner face directed into said furnace when said door is positioned in said doorway, said door having a gas inlet port and a gas outlet port, said outlet port being positioned on said door inner face;
    b. a door frame positioned in said furnace doorway, said door frame adapted to receive and mate at least in part with said door;
    c. a recirculation port, said recirculation port opening into said delacquering chamber and providing a path for exhaust gases to exit said delacquering chamber; and
    d. a gas propelling device in gaseous communication with said recirculation port and said door inlet port, said propelling device drawing exhaust gases from said recirculation port, and urging said exhaust gases into said door inlet port and out said door outlet port.

2. The header gate system of claim 1, further comprising a gas manifold, said gas manifold extending from and providing a gas conduit between said door inlet port and said door outlet port, said gas propelling device urging said exhaust gases into said door inlet port, through said door gas manifold, and out said door outlet port.

3. The header gate system of claim 2, wherein said gas manifold is embedded at least in part in said door.

4. The header gate system of claim 1, further comprising a directional gas nozzle attached to said door outlet port, said gas nozzle directing said exhaust gases exiting said outlet port in a predetermined direction away from said door inner surface.

5. The header gate system of claim 4, wherein said gas nozzle is a directionally adjustable, said gas nozzle selectively directing said exhaust gases exiting said outlet port in one or more predetermined directions away from said door inner surface.

6. The header gate system of claim 1, further comprising a plurality of outlet ports directed into said furnace, said manifold being in communication with and providing a gas conduit between said door inlet port and each of said plurality of outlet ports, said propulsion device drawing exhaust gases from said recirculation port, and urging said exhaust gases into said door inlet port, through said gas manifold, and out one or more of said plurality of door outlet ports.

7. The header gate system of claim 6, further comprising a directional gas nozzle attached to one of said plurality of door outlet ports, said gas nozzle directing said exhaust gases exiting said one of said plurality of outlet ports in a predetermined direction away from said door inner surface.

8. The header gate system of claim 6, wherein said gas nozzle is directionally adjustable, said gas nozzle selectively directing said exhaust gases exiting said one of said plurality of outlet ports in one or more predetermined directions away from said door inner surface.

9. The header gate system of claim 1, wherein said recirculation port opens into said exhaust hood and provides a path for exhaust gases from said delacquering chamber to exit said exhaust hood.

10. The header gate system of claim 1, wherein said door frame slopes generally outward from top to bottom.

11. The header gate system of claim 1, wherein said gas propelling device comprises a blower.

12. The header gate system of claim 1, further comprising a hot gas generator, said hot gas generator having a gas inlet and an exhaust gas outlet, said gas inlet being connected to and opening into said recirculation port, said gas outlet being connected to and opening into said gas propelling device, said hot gas generator collecting exhaust gases from said recirculation port, generating hot exhaust gases, creating an exhaust gas mixture of said generated hot exhaust gases and said exhaust gases from said recirculation port, and supplying said exhaust gas mixture to said gas propelling device.

13. The header gate system of claim 1, further comprising an automatic gas control loop, said control loop having a sensor and a regulator, said regulator being adapted to operate said gas propelling device, said sensor measuring one of said temperature, concentration of volatiles, and pressure in said furnace, and controlling the operation of said gas propelling device in response to said measurement.

14. The header gate system of claim 13, wherein said gas control loop further comprises an electronic controller operatively associated with said sensor, said sensor generating an electronic signal indicative of one of said temperature, concentration of volatiles, and pressure in said furnace, and communicating said signal to said electronic controller, said electronic controller controlling the operation of said gas propelling device in response to said signal.

15. The header gate system of claim 14, wherein said furnace comprises a computer control system and said furnace computer control system comprises said electronic controller, said furnace computer control system controlling the operation of said gas propelling device in response to said electronic signal from said sensor.

16. A header gate system for a metal recycling furnace, said furnace having a delacquering chamber and a melt chamber, said furnace having a doorway opening into said delacquering chamber, said header gate system comprising:
   a. a door adapted to close at least in part said furnace doorway, said door having an inner face directed into said furnace when said door is positioned in said furnace doorway, said door having a gas inlet port and a gas outlet port, said outlet port being positioned on said door inner face;
   b. a door frame positioned in said furnace doorway, said door frame adapted to receive and mate at least in part with said door;
   c. a recirculation port, said recirculation port opening into said one of said delacquering chamber and said melt chamber, said recirculation port providing a path for exhaust gases to exit said one of said delacquering chamber and said melt chamber; and
   d. a gas propelling device in gaseous communication with said recirculation port and said door inlet port, said propelling device drawing exhaust gases from said recirculation port, and urging said exhaust gases into said door inlet port and out said door outlet port.

17. The header gate system of claim 16, further comprising a hot gas generator, said hot gas generator having a gas inlet and an exhaust gas outlet, said gas inlet being connected to and opening into said recirculation port, said gas outlet being connected to and opening into said gas propelling device, said hot gas generator collecting exhaust gases from said recirculation port, generating hot exhaust gases, creating an exhaust gas mixture of said generated hot exhaust gases and said exhaust gases from said recirculation port, and supplying said exhaust gas mixture to said gas propelling device.

18. The header gate system of claim 16, further comprising an automatic gas control loop, said control loop having a sensor and a regulator, said regulator being adapted to operate said gas propelling device, said sensor measuring one of said temperature, concentration of volatiles, and pressure in said furnace, and controlling the operation of said gas propelling device in response to said measurement.

19. A header gate system for a metal recycling furnace, said furnace having a delacquering chamber and a melt chamber, said furnace having a doorway opening into said delacquering chamber, said furnace having an exhaust hood positioned proximate one of said delacquering chamber and said melt chamber, said exhaust hood collecting exhaust gases from said one of said delacquering chamber and said melt chamber, said furnace having a computer control system, said header gate system comprising:
   a. a door adapted to close at least in part said furnace doorway, said door having an inner face directed into one of said delacquering chamber and said melt chamber when said door is positioned in said furnace doorway, said door having a gas inlet port and a gas outlet port, said outlet port being positioned on said door inner face;
   b. a door frame positioned in said furnace doorway, said door frame adapted to receive and mate at least in part with said door;
   c. a recirculation port, said recirculation port opening into said exhaust hood, said recirculation port providing a path for exhaust gases to exit said exhaust hood;
   d. a hot gas generator, said hot gas generator having a gas inlet and an exhaust gas outlet, said gas inlet being connected to and opening into said recirculation port, said hot gas generator collecting exhaust gases from said recirculation port, generating hot exhaust gases, and creating an exhaust gas mixture of said generated hot exhaust gases and said exhaust gases from said recirculation port; and
   e. a gas propelling device in gaseous communication with said hot gas generator exhaust gas outlet and said door inlet port, said propelling device drawing said exhaust gas mixture from said hot gas generator through said exhaust gas outlet, and urging said exhaust gases into said door inlet port and out said door outlet port.

20. The header gate system of claim 19, further comprising an automatic gas control loop, said control loop having a sensor and a regulator, said regulator being adapted to operate one of said hot gas generator and said gas propelling device, said sensor measuring one of said temperature, concentration of volatiles, and pressure in said furnace, and controlling the operation of said one of said hot gas generator and said gas propelling device in response to said measurement.

* * * * *